United States Patent
Choiniere et al.

(10) Patent No.: US 9,851,202 B2
(45) Date of Patent: Dec. 26, 2017

(54) DETERMINING A RETURN LASER SIGNAL ASSOCIATED WITH A TARGET IN LASER RANGE FINDERS

(71) Applicant: BAE Systems Information and Electronic Systems Integration Inc., Nashua, NH (US)

(72) Inventors: Michael J. Choiniere, Merrimack, NH (US); Egor V. Degtiarev, Merrimack, NH (US); Eric C. Gausch, Merrimack, NH (US); Derek P. Janiak, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 302 days.

(21) Appl. No.: 14/763,621

(22) PCT Filed: Nov. 27, 2014

(86) PCT No.: PCT/US2014/067793
§ 371 (c)(1),
(2) Date: Jul. 27, 2015

(87) PCT Pub. No.: WO2015/122955
PCT Pub. Date: Aug. 20, 2015

(65) Prior Publication Data
US 2016/0265913 A1 Sep. 15, 2016

Related U.S. Application Data

(60) Provisional application No. 61/909,630, filed on Nov. 27, 2013.

(51) Int. Cl.
*G01C 3/08* (2006.01)
*G01S 17/08* (2006.01)
(Continued)

(52) U.S. Cl.
CPC ............... *G01C 3/08* (2013.01); *G01S 7/489* (2013.01); *G01S 7/4873* (2013.01); *G01S 17/08* (2013.01); *G01S 7/497* (2013.01)

(58) Field of Classification Search
CPC ......... G01C 3/08; G01S 7/4873; G01S 7/497; G01S 7/489; G01S 17/08
(Continued)

(56) References Cited

U.S. PATENT DOCUMENTS

| 3,644,043 A | 2/1972 | Jones |
| 5,282,014 A | 1/1994 | Ruhl et al. |

(Continued)

*Primary Examiner* — Mark Hellner
(74) *Attorney, Agent, or Firm* — Scott J. Asmus (57) ABSTRACT

A laser range finder (LRF) and an automated method for determining a return laser signal associated with a target thereof are disclosed. In one example embodiment, the LRF includes a laser beam emitter to emit a laser beam towards a target. Further, the LRF includes a receiver circuit to receive multiple return laser signals reflected from objects including the target and to determine an amplitude of each of the multiple return laser signals. Furthermore, the LRF includes a processor coupled to the receiver circuit to compare the amplitude of each of the multiple return laser signals with a range varying threshold that accounts for range and atmospheric losses and to determine one of the multiple return laser signals as being associated with the target based on the comparison.

9 Claims, 6 Drawing Sheets

(51) Int. Cl.
*G01S 7/487* (2006.01)
*G01S 7/489* (2006.01)
*G01S 7/497* (2006.01)

(58) Field of Classification Search
USPC ........................................................ 356/4.07
See application file for complete search history.

(56) References Cited

U.S. PATENT DOCUMENTS

| | | | |
|---|---|---|---|
| 5,623,335 A | 4/1997 | Bamberger | |
| 5,691,808 A | 11/1997 | Nourrcier et al. | |
| 5,831,718 A | 11/1998 | Desai et al. | |
| 6,188,319 B1 | 2/2001 | Frucht | |
| 6,711,352 B2 * | 3/2004 | Kohno | G02B 7/32 356/3.04 |
| 8,842,261 B2 * | 9/2014 | Frucht | G01S 7/4865 356/3.01 |
| 2012/0176593 A1 | 7/2012 | Frucht | |

* cited by examiner

DETERMINING A RETURN LASER SIGNAL ASSOCIATED WITH A TARGET IN LASER RANGE FINDERS

CROSS-REFERENCE TO RELATED APPLICATIONS

This Application claims rights under 35 USC §119(e) from U.S. Application 61/909,630 filed Nov. 27, 2013, the contents of which are incorporated herein by reference.

BACKGROUND OF THE INVENTION

Field of the Invention

The present invention relates to laser range finders and more particularly to determining a return laser signal associated with a target in the laser range finders.

Brief Description of Related Art

A typical laser range finder (LRF) emits a laser beam towards a target and receives multiple return laser signals with a leading edge crossing a threshold value. Further, the LRF determines crude amplitude of each return laser signal and displays the crude amplitude of the return laser signals for a user to select the return laser signal associated with the target. Further, the user may select one of the return laser signals as being associated with the target based on heuristic approaches. However, these approaches may result in an inaccurate selection of the return laser signal associated with the target.

SUMMARY OF THE INVENTION

A laser range finder (LRF) and an automated method for determining a return laser signal associated with a target thereof are disclosed. According to one aspect of the present subject matter, the LRF includes a laser beam emitter to emit a laser beam towards the target. Further the LRF includes a receiver circuit to receive multiple return laser signals reflected from objects including the target and to determine an amplitude of each return laser signal. Furthermore, the LRF includes a processor coupled to the receiver circuit to compare the amplitude of each return laser signal with a range varying threshold that accounts for range and atmospheric losses and to determine one of the return laser signals as being associated with the target based on the comparison.

According to another aspect of the present subject matter, a laser beam is emitted towards the target. Further, multiple return laser signals reflected from objects including the target are received. Furthermore, an amplitude of each return laser signal is determined. In addition, the amplitude of each return laser signal is compared with a range varying threshold. The range varying threshold is based on range and atmospheric losses. Also, one of the return laser signals associated with the target is determined based on the comparison.

According to yet another aspect of the present subject matter, a non-transitory machine-readable storage medium including instructions for determining a return laser signal associated with the target in the LRF, having instructions that, when executed by a processor causes the processor to compare an amplitude of each of multiple return laser signals with a range varying threshold that accounts for range and atmospheric losses and to determine one of the return laser signals as being associated with the target based on the comparison. The multiple return laser signals are laser signals reflected by objects including the target.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design. The present technique determines accurate amplitude of each return laser signal and then determines or identifies a likely return laser signal associated with a target, in a laser range finder (LRF), using a range varying threshold that accounts for both range and atmospheric losses. According to the present technique, by using multiple analog to digital (A/D) converters positioned in a receiver circuit of the LRF, a full dynamic range can be covered resulting in accurate determination of amplitude of the return laser signals. Further, by using the range varying threshold, the return laser signals can then be compared on a signal by signal basis and the likely return laser signal associated with the target is determined.

Figure 1:
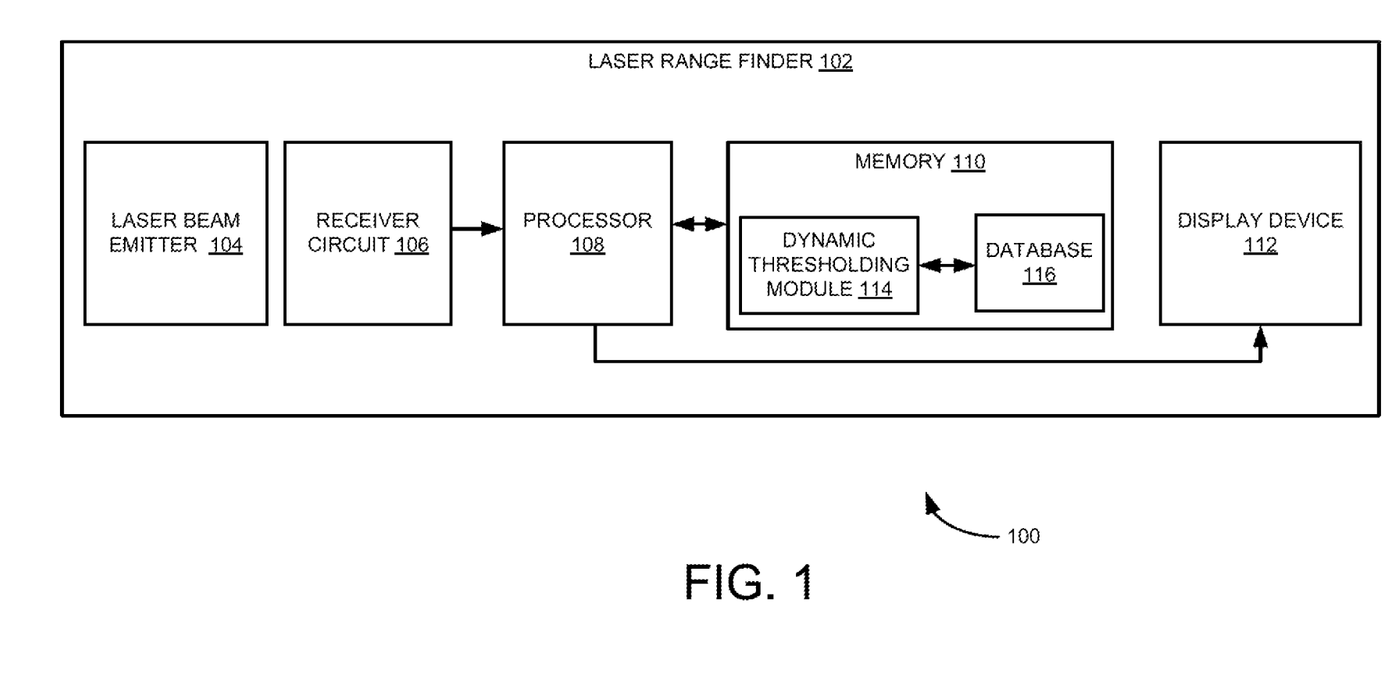
FIG. 1 is a block diagram of a laser range finder (LRF) for determining a return laser signal associated with a target, according to an example embodiment of the present subject matter.

FIG. 1 is a block diagram 100 of a laser range finder (LRF) 102 for determining a return laser signal associated with a target, according to an example embodiment of the present subject matter. As shown in FIG. 1, the LRF 102 includes a laser beam emitter 104, a receiver circuit 106, a processor 108 coupled to the receiver circuit 106, a memory 110 communicatively coupled to the processor 108, and a display device 112 coupled to the processor 108. Furthermore, the memory 110 includes a dynamic thresholding module 114 and a database 116 coupled to the dynamic thresholding module 114. The database 116 may include range varying thresholds for various day and night conditions. The thresholds are determined using heuristic approaches and may account for range and atmospheric losses during various day and night conditions and different atmospheric conditions.

In operation, the laser beam emitter 104 emits a laser beam towards the target. Further the receiver circuit 106 receives multiple return laser signals reflected from objects (e.g., a branch of a tree that is behind or in front of the target) including the target. The objects including the target are illuminated by the laser beam. The receiver circuit 106 then determines an amplitude of each return laser signal. This is explained in more detail with reference to FIGS. 2 and 2A. The dynamic thresholding module 114 may then receive the amplitude of each return laser signal from the receiver circuit 106. Furthermore, the dynamic thresholding module 114 compares the amplitude of each return laser signal with an associated range varying threshold corresponding to day or night conditions and atmospheric conditions. For example, the range varying threshold can be an expected signal for a 10% reflective target as a function of range and atmospheric losses on a moderate clear day.

The dynamic thresholding module 114 then determines one of the return laser signals as being associated with the target based on the comparison. In an example implementation, the dynamic thresholding module 114 determines an amount of the amplitude of each return laser signal above the range varying threshold based on the comparison. For example, the amount of the amplitude above the range varying threshold indicates actual laser energy received by the objects after accounting for the range and atmospheric losses. The dynamic thresholding module 114 then declares the one of the return laser signals having a highest amount of the amplitude above the range varying threshold as the return laser signal associated with the target. This is explained in more detail with reference to FIG. 3. Also, the dynamic thresholding module 114 displays the amplitude of the return laser signal associated with the target on the display device 112. In the discussion herein, the dynamic thresholding module 114 has been described as a combination of circuitry and executable instructions. Such component can be implemented in a number of fashions. Looking at FIG. 1, the executable instructions can be processor executable instructions, such as program instructions, stored on a memory resource, which is a tangible, non-transitory computer readable storage medium, and the circuitry can be electronic circuitry for executing those instructions.

Figure 2:
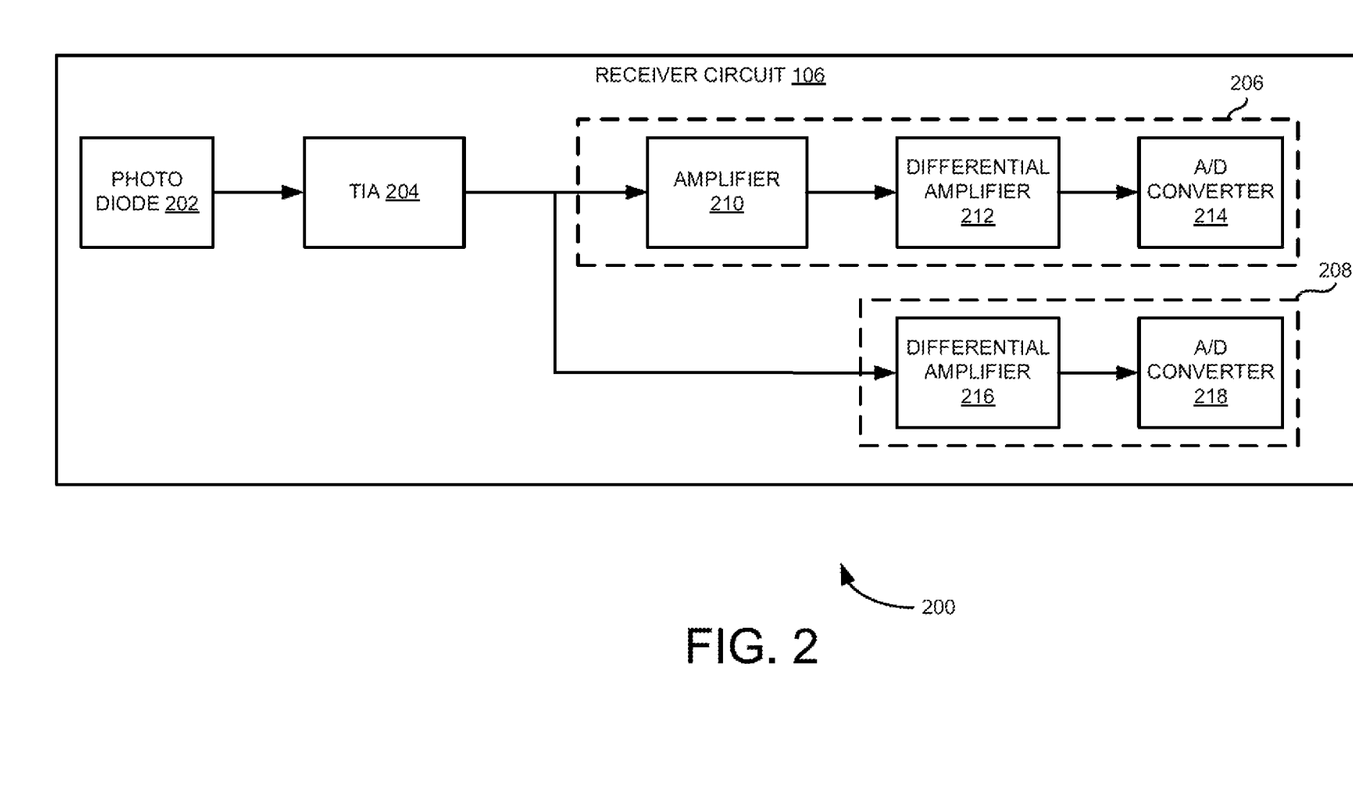
FIG. 2 is a block diagram of a receiver circuit, such as the one shown in FIG. 1, for determining an amplitude of a return laser signal, according to an example embodiment of the present subject matter.
Figure 2A:
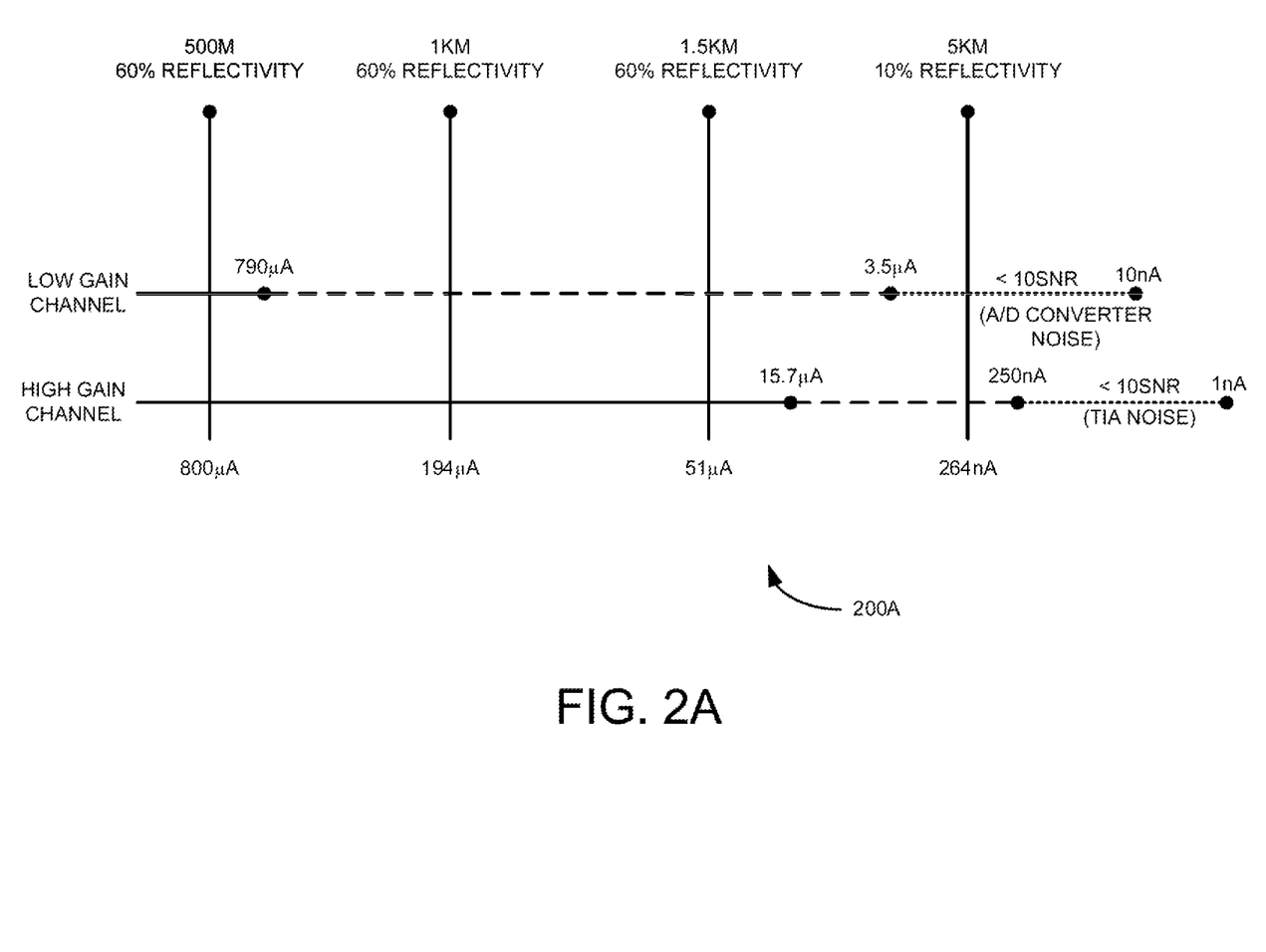
FIG. 2A is a schematic illustrating strength of a return laser signal supported by high and low gain channels, such as those shown in FIG. 2, according to an example embodiment of the present subject matter.

FIG. 2 is a block diagram 200 of the receiver circuit 106, such as the one shown in FIG. 1, for determining an amplitude of a return laser signal. As shown in FIG. 2, the receiver circuit 106 includes a photodiode 202 (e.g., a PIN diode or an avalanche photodiode (APD)) that is directly coupled with a transimpedance amplifier (TIA) 204. For example, the TIA 204 may have a gain (G) of 4000 decibel (dB) and an input noise of approximately 26 nano ampere (nA). The receiver circuit 106 further includes high and low gain channels 206 and 208, respectively, connected to the TIA 204 for covering different ranges. For example, the low gain channel 208 may cover from 500 meters to 3 kilometer (km) range and the high gain channel 206 may cover longer ranges from 2 km to 5 km. The overlap range (2 km to 3 km) provides a calibration region between high and low gains. The combination of the high and low gain channels 206 and 208, respectively, provides a linear amplitude measurement with over 50 decibel (dB) dynamic range and eliminates uncertainty in varying gain.

Further as shown in FIG. 2, the high gain channel 206 includes an amplifier 210 with a gain of 30 dB, a differential amplifier 212 with unity gain coupled to the amplifier 210 and a 12 bit A/D converter 214 coupled to the differential amplifier 212. Furthermore, the low gain channel 208 includes a differential amplifier 216 and a 12 bit A/D converter 218 coupled to the differential amplifier 216. For example, the differential amplifier 216 may have a gain of 0.6 dB. The gain difference between the low and high channels 208 and 206, respectively, is approximately of 50 times.

In operation, the photodiode 202 may receive the return laser signals and convert light into current. Further, the TIA 204 may amplify or convert the return laser signal and send the return laser signal to the high gain channel 206 or low gain channel 208. In other words, the TIA 204 may amplify or convert the current to usable voltage and send the amplified or converted return laser signal to the high gain channel 206 and/or low gain channel 208. The TIA 204 may send the return laser signal (voltage) into the high gain channel 206 and low gain channel 208 based on a range at which the return laser signal is reflected. In an example implementation, the return laser signal is routed to both high and low gain channels 206 and 208, respectively, and if the return laser signal is in the dynamic range of the channel, it is detected and amplitude of the return laser signal is determined without saturation. If it is not in the dynamic range of the channel, it may not be detected in the low gain channel 208 or it may saturate if the return laser signal is too high in the high gain channel 206. There is a little overlap where an amplitude of a return laser signal is accurately determined in both the high and low gain channels 206 and 208, respectively. When strength of the return laser signal is between 15.7 micro ampere (μA) to 250 nA, then it is accurately measured or determined in the high gain channel 206 and when the strength of the return laser signal is between 790 μA to 3.5 μA, then it is accurately measured or determined in the low gain channel 208. This is shown in detail with reference to schematic 200A of FIG. 2A. The schematic 200A illustrates strength of a return laser signal at various ranges and the strength of the return laser signal supported by the high gain channel 206 and low gain channel 208. The high gain channel 206 or low gain channel 20S may then determine the amplitude of the return laser signal.

Figure 3:
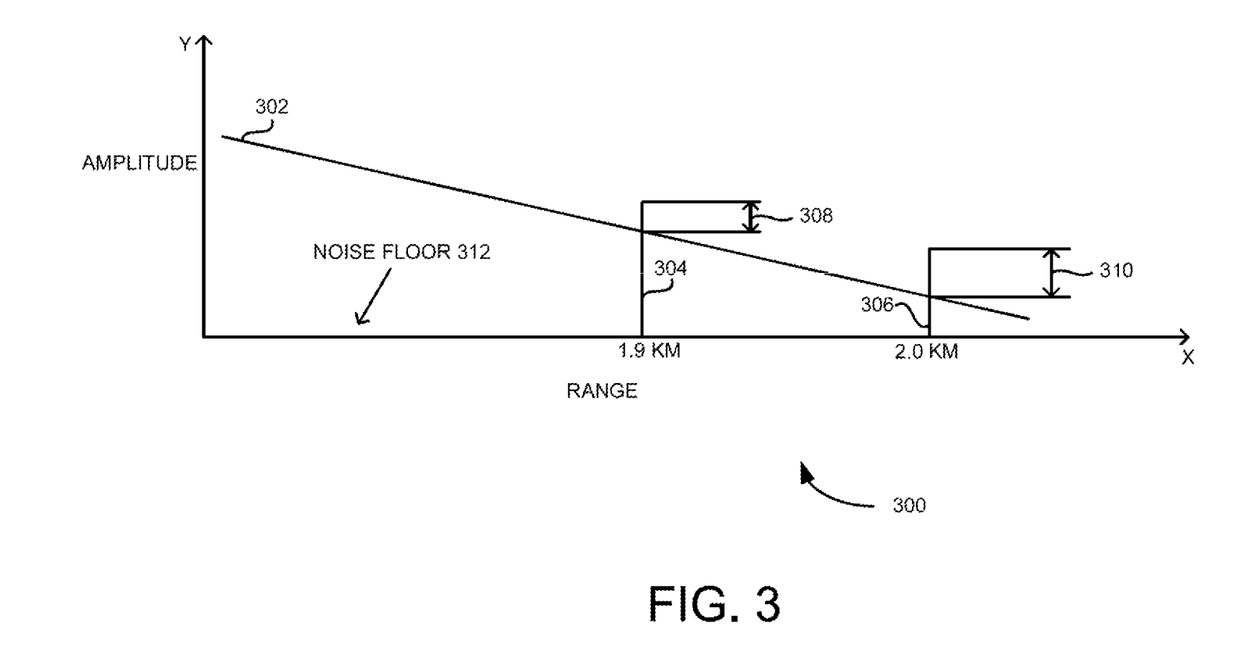
FIG. 3 is a graph illustrating an amount of amplitude of return laser signals above a range varying threshold, according to an example embodiment of the present subject matter.

FIG. 3 is a graph 300 illustrating an amount of amplitude of return laser signals above a range varying threshold 302, according to an example embodiment of the present subject matter. In other words, the graph 300 illustrates compensating range and atmospheric attenuation from the return laser signals using the range varying threshold 302. For example, the range varying threshold 302 represents an expected signal for a 10% reflective target as a function of range and atmospheric losses on a moderate clear day. As shown in FIG. 3, x-axis of the graph 300 indicates range and y-axis of the graph 300 indicates amplitude of return laser signals. Further, the graph 300 shows amplitudes. 304 and 306 of two return laser signals (R1 and R2) received by a LRF from a range of 1.9 km and 2.0 km, respectively. For example, the R1 and R2 are laser signals reflected from a target and a small branch, a tree in front of the target. The small branch causes the return laser signal (R1) 100 meters in front of the target. In one embodiment, an amount of the amplitudes 304 and 306 above the range varying threshold 302 is determined (e.g., 308 and 310, respectively). The determination is measured by the amplitude above the range varying threshold 302 and not a noise floor 312 and represents the amount of laser energy hitting the R2 versus R1. In this example, it is the R2 that received the majority of the laser energy even though the target is far than the tree and appeared to be a smallest laser signal. Thus, the R2 is declared as the return laser signal associated with the target and the amplitude 306 is displayed to the user. In some scenarios, the target may be a first return with blow by hitting a tree line 100 meters behind the target. In these scenarios, the amplitude as applied to the range varying threshold provides information needed to make a decision.

Figure 4:
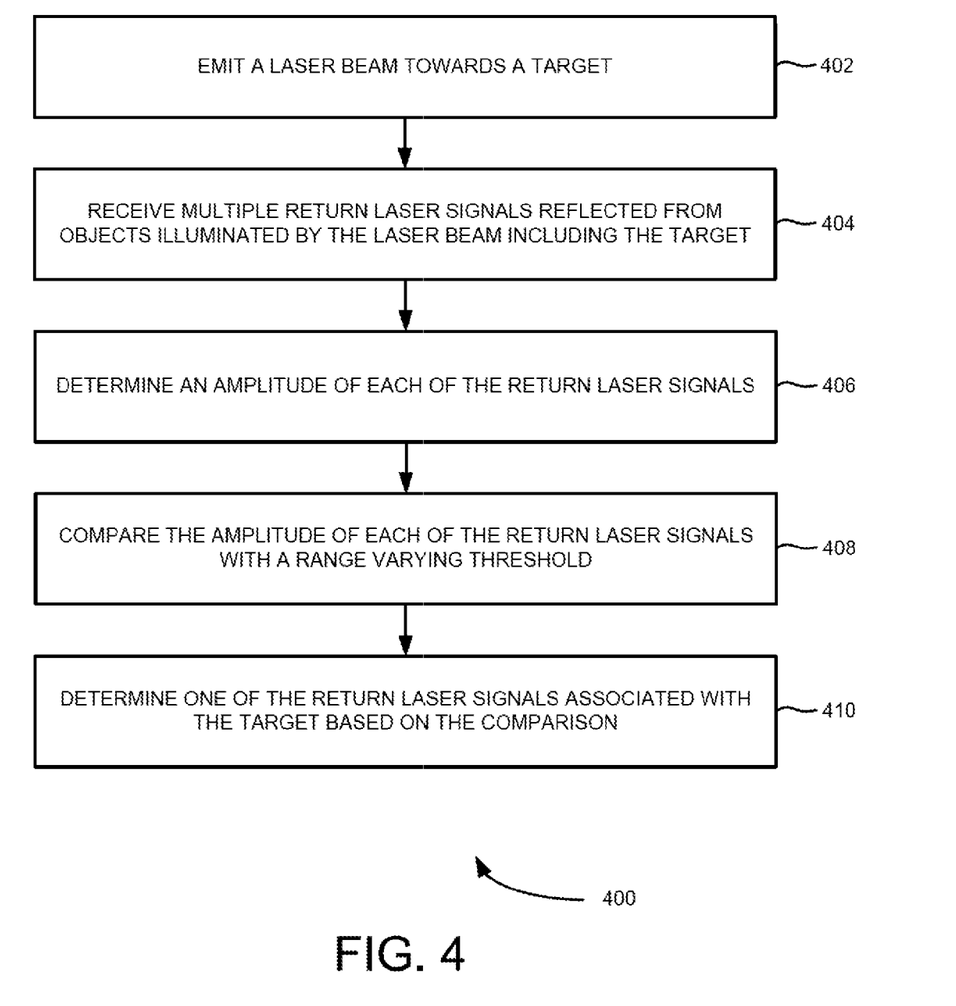
FIG. 4 is a flowchart of an automated method for determining a return laser signal associated with a target in a LRF, according to an example embodiment of the present subject matter.

FIG. 4 is a flowchart 400 of an automated method for determining a return laser signal associated with a target in a LRF, according to an example embodiment of the present subject matter. At block 402, a laser beam is emitted towards the target. At block 404, multiple return laser signals reflected from objects illuminated by the laser beam including the target are received. The term "laser beam" refers to laser energy emitted towards the target and the term "laser signal" refers to laser energy reflected from the object. At block 406, an amplitude of each return laser signal is determined. At block 408, the amplitude of each of the multiple return laser signals is compared with a range varying threshold. The range varying threshold is based on range and atmospheric losses. At block 410, one of the return laser signals that is associated with the target is determined based on the comparison. This is explained in more detail with reference to FIGS. 1-3.

Figure 5:
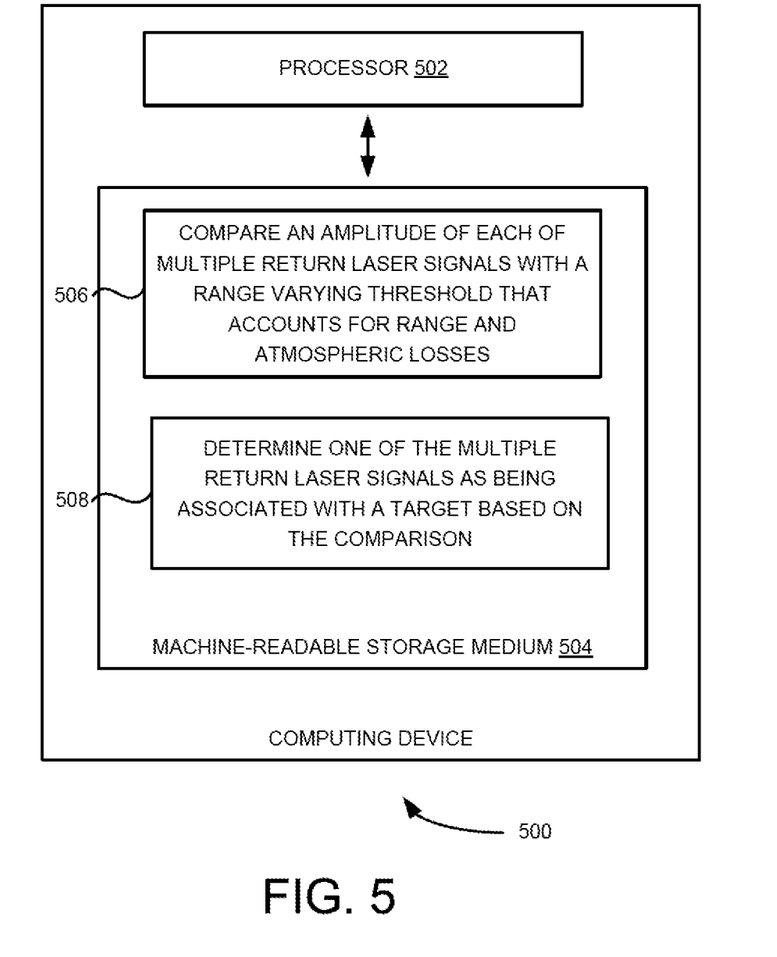
FIG. 5 is a block diagram of a computing device for determining a return laser signal associated with a target in a LRF, according to an example embodiment of the present subject matter.

FIG. 5 is a block diagram of a computing device 500 for determining a return laser signal associated with a target in a LRF, according to an example embodiment of the present subject matter. The computing device 500 includes a processor 502 and a machine-readable storage medium 504 communicatively coupled through a system bus. The processor 502 may be any type of central processing unit (CPU), microprocessor, or processing logic that interprets and executes machine-readable instructions stored in the machine-readable storage medium 504. The machine-readable storage medium 504 may be a random access memory (RAM) or another type of dynamic storage device that may store information and machine-readable instructions that may be executed by the processor 502. For example, the machine-readable storage medium 504 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, the machine-readable storage medium 504 may be a non-transitory machine-readable storage medium. In an example, the machine-readable storage medium 504 may be remote but accessible to the computing device 500.

The machine-readable storage medium 504 may store instructions 506 and 508. In an example, the instructions 506 may be executed by processor 502 to compare an amplitude of each of multiple return laser signals with a range varying threshold that accounts for range and atmospheric losses. The multiple return laser signals are laser signals reflected by objects including the target. The instructions 508 may be executed by processor 502 to determine one of the multiple return laser signals as being associated with the target based on the comparison.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby, enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A laser range finder (LRF), comprising:
   a laser beam emitter to emit a laser beam towards a target;
   a receiver circuit to:
   receive multiple return laser signals reflected from objects including the target; and
   determine an amplitude of each of the multiple return laser signals; and
   a processor coupled to the receiver circuit to:
   compare the amplitude of each of the multiple return laser signals with a range varying threshold that accounts for range and atmospheric losses, wherein the processor determines the amount of the amplitude of each of the multiple return laser signals above the range varying threshold that indicates actual laser energy received by the objects after accounting for the range and atmospheric losses; and
   determine one of the multiple return laser signals associated with the target based on the comparison.

2. The LRF of claim 1, wherein the amount of the amplitude above the range varying threshold indicates actual laser energy received by the objects after accounting for the range and atmospheric losses.

3. The LRF of claim 1, further comprising:
   a display device coupled to the processor to display the amplitude of the one of the multiple return laser signals associated with the target.

4. An automated method for determining a return laser signal associated with a target in a laser range finder (LRF), comprising:
   emitting a laser beam towards a target;
   receiving multiple return laser signals reflected from objects including the target;
   determining an amplitude of each of the multiple return laser signals;
   comparing the amplitude of each of the multiple return laser signals with a range varying threshold, the range varying threshold is based on range and atmospheric losses; and
   determining one of the multiple return laser signals as being associated with the target based on the comparison, wherein determining which of the multiple return laser signals is associated with the target further comprises:
   determining an amount of the amplitude of each of the multiple return laser signals above the range varying threshold based on the comparison; and
   declaring the one of the multiple return laser signals having a highest amount of the amplitude above the range varying threshold as the return laser signal associated with the target.

5. The method of claim 4, wherein the amount of the amplitude above the range varying threshold indicates actual laser energy received by the objects after accounting for the range and atmospheric losses.

6. The method of claim 4, further comprising:
   displaying the amplitude of the one of the multiple return laser signals associated with the target on a display device.

7. A non-transitory machine-readable storage medium comprising instructions for determining a return laser signal associated with a target in a laser range finders (LRF), the instructions executable by a processor to:
- compare an amplitude of each of multiple return laser signals with a range varying threshold that accounts for range and atmospheric losses, wherein the multiple return laser signals are laser signals reflected by objects including the target; and
- determine one of the multiple return laser signals as being associated with the target based on the comparison,
- wherein the instructions to determine which of the multiple return laser signals is associated with the target based on the comparison comprise instructions to:
- determine an amount of the amplitude of each of the multiple return laser signals above the range varying threshold based on the comparison; and
- declare one of the multiple return laser signals having a highest amount of the amplitude above the range varying threshold as the return laser signal associated with the target.

8. The non-transitory machine-readable storage medium of claim 7, wherein the amount of the amplitude above the range varying threshold indicates actual laser energy received by the objects after accounting for the range and atmospheric losses.

9. A laser range finder (LRF), comprising:
- a laser beam emitter to emit a laser beam towards a target;
- a receiver circuit to:
  - receive multiple return laser signals reflected from objects including the target; and
  - determine an amplitude of each of the multiple return laser signals;
- a processor coupled to the receiver circuit to:
  - compare the amplitude of each of the multiple return laser signals with a range varying threshold that accounts for range and atmospheric losses;
  - determine an amount of the amplitude of each of the multiple return laser signals above the range varying threshold based on the comparison; and
  - declare the one of the multiple return laser signals having a highest amount of the amplitude above the range varying threshold as the return laser signal associated with the target, wherein the amount of the amplitude above the range varying threshold indicates actual laser energy received by the objects after accounting for the range and atmospheric losses; and
- a display device coupled to the processor to display the amplitude of the one of the multiple return laser signals associated with the target.

* * * * *